United States Patent [19]
Holland

[11] Patent Number: 5,324,429
[45] Date of Patent: Jun. 28, 1994

[54] BILGE OIL ABSORBER AND SOLIDIFIER

[76] Inventor: Herbert W. Holland, 2314 Chimney Rock, Houston, Tex. 77057

[21] Appl. No.: 51,454

[22] Filed: Apr. 19, 1993

[51] Int. Cl.$^5$ ............................................. B01D 15/00
[52] U.S. Cl. ...................... 210/484; 210/489; 210/502.1; 210/505
[58] Field of Search ............... 210/500.1, 502.1, 282, 210/484, 924, 505, 489

[56] References Cited

U.S. PATENT DOCUMENTS

| | | | |
|---|---|---|---|
| 4,588,505 | 5/1986 | Walley et al. | 210/502.1 |
| 4,686,776 | 8/1987 | Matsubara | 210/502.1 |
| 4,775,473 | 10/1988 | Johnson et al. | 210/502.1 |
| 4,886,697 | 12/1989 | Perdelwitz, Jr. et al. | 428/192 |
| 5,019,254 | 5/1991 | Abrevaya et al. | 210/502.1 |
| 5,045,579 | 9/1991 | Sugerman | 524/128 |
| 5,182,018 | 1/1993 | Langston | 210/502.1 |
| 5,186,831 | 2/1993 | DePetris | 210/502.1 |

*Primary Examiner*—Peter A. Hruskoci
*Assistant Examiner*—Robert James Popovics

[57] ABSTRACT

A pillow for placement in enclosed areas utilized to collect and contain spilled or leaked hydrocarbons such as boat bilges and sumps absorbs pollutants that come in contact. The absorbed material is solidified within the pillow into a rubber-like mass. The consolidated mass will float indefinitely and is easily retrieved and handled for disposal. The pillow will not leech solidified hydrocarbons when exposed to pressure limits used to determine landfill suitability.

1 Claim, 1 Drawing Sheet

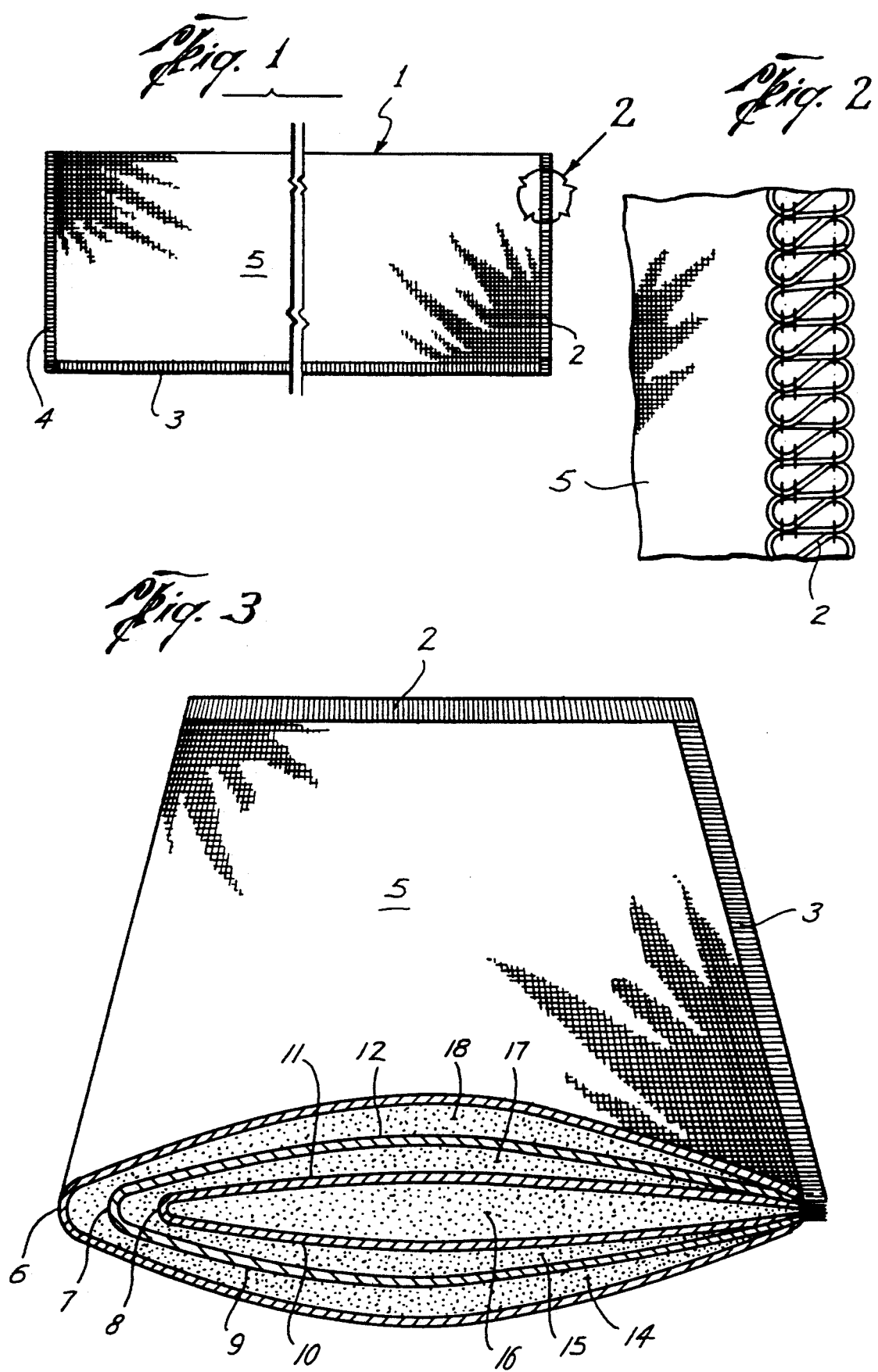

BILGE OIL ABSORBER AND SOLIDIFIER

BACKGROUND OF THE INVENTION

The present invention relates to absorbent devices used for containing and removing leaked and spilled hydrocarbons in recreational and commercial marine vessels.

For recreational and commercial vessels, there is a need to remove hydrocarbons spilled or leaked into bilges and sumps as part of the routine maintenance of the vessel. This unpleasant, yet critically important, task is necessary to prevent the hydrocarbons that accumulate in the sump or bilge from polluting an adjacent waterway by inadvertently being pumped or expelled from the vessel.

One common material used in absorbent devices for the marine environment is polypropylene fabric. This non-woven petrochemical based fabric possesses the physical properties of absorbing hydrocarbons while repelling water. It can be packaged as a flat pad or sheet, or can be rolled into a long cylindrical boom for placement in the hull of the vessel to absorb the hydrocarbons. It is also packaged as strips of the fabric encased in an open weave plastic net, resulting in a sausage-like boom. Another absorbent device relies on ground-up chicken feathers encased in a cotton pillow case. In each instance, these products are placed in bilges and sumps to extract the hydrocarbons that pool there.

The prior art absorbent devices are subject to having the absorbed hydrocarbons released by gravity, column weight or pressure upon removal from the bilge. Disposal of these items often results in the transfer of a pollutant from one environment to another.

SUMMARY OF THE INVENTION

In accordance with the present invention, an absorbent device is provided which will not only absorb hydrocarbons, but will also quickly and irreversibly solidify the absorbed hydrocarbon into an easily retrievable solid rubber-like mass. The device is formed as a pillow from a sheet of polypropylene fabric sewn to form layered chambers within the envelope of the overall pillow shape. Each chamber contains an amount of an organic polymer. The pillow is sewn using an overlock seam, sealing the polymer in each chamber and producing a strong, neat seam on three sides. The polypropylene fabric absorbs hydrocarbons on contact. This action, coupled with the unique stratification design of the chambered pillow speeds migration of hydrocarbons through the alternating multi-layers of fabric and polymer.

BRIEF DESCRIPTION OF THE DRAWINGS

The accompanying drawings illustrate the preferred embodiment invention in which:

FIG. 1 is a top view of the device showing its pillow-shaped envelope form and the seams sewn on three sides;

FIG. 2 shows the detail of the overlock seam used to seal the polymer in the chambers of the pillow; and FIG. 3 shows a cross section of the pillow, indicating the layers of polymer separated by the polypropylene fabric.

DESCRIPTION OF THE PREFERRED EMBODIMENT

In FIG. 1, an absorbent device 1 in accordance with the present invention is shown in a pillow-shaped configuration having an envelope 5 with seaming of three of the four sides 2, 3 and 4. This seam is shown in greater detail in FIG. 2.

Referring to FIG. 3, the cross section of the pillow prior to closure at seem 4 reveals the stratification design of the pillow which is formed by stacking pieces of fabric and folding them over at points 6, 7 and 8. The pieces are then joined using an overlock seam 2 and 3 on two sides, resulting in chambers 14, 15, 16, 17 and 18 arranged one on top of another and enclosed by a common outer envelope layer 5. FIG. 3 shows the effect of alternate multi-layering of polypropylene fabric layers 9, 10, 11 and 12 to form chambers 14, 15, 16, 17 and 18. As shown in FIG. 1, the pillow is seamed shut 4 on the open side that is used to introduce the polymer to each of the chambers of the pillow.

The fabric layers are consolidated at the seams 2 and 3. This allows hydrocarbons that come in contact with the outer layer of fabric 5 to migrate via the seams 2, 3 and 4 under capillary attraction to the interior layers of fabric 9, 10, 11 and 12 and propagate throughout the pillow.

In accordance with the preferred embodiment directed to boat bilges and the like, the pillow envelope 5 measures $17'' \times 6'' \times 1''$. Each pillow chamber contains approximately 0.8 ounces by weight of the absorbent and solidifying polymer material for an approximate total weight of four ounces of polymer in the pillow. The polymer material is preferably polynorbornene available under the trademark Norsorex APX1, or an equivalent.

Ambient temperature and the viscosity of the hydrocarbon to be solidified are the two most critical factors in determining the rate of absorption and the amount of time required to solidify the broad spectrum of hydrocarbons this invention is designed to contain for removal and disposal. To enhance the polymer's effective interaction with pollutants, the pillow's construction utilizes the layering of polymer material and fabric to control the rate of absorption and solidification.

The stratification design allows for optimum efficiency in utilizing the solidifying properties of the polymer. Very light viscosity hydrocarbons react almost instantaneously with the polymer and are exposed to no more polymer than can be fully utilized for absorption and solidification. Stratification promotes rapid migration of light viscosity hydrocarbons throughout the interior of the pillow while slowing migration of the hydrocarbon through the outer surface envelope area and exposure to the polymer. The extremely rapid reaction between the light viscosity hydrocarbon and the polymer could otherwise result in the loose polymer located within the volume of the pillow being surrounded by a non-permeable rubber shell thereby preventing the enclosed polymer from being used to solidify additional hydrocarbons.

In addition, the stratification design allows the heavier viscosity hydrocarbons that migrate through the layers of polypropylene fabric to be suspended inside the pillow awaiting the polymer to absorb them and begin the solidification process.

The properties of the polypropylene fabric that allow for rapid absorption and migration of all viscosities of hydrocarbons effectively gives the device maximum surface area exposure of the polymer through the stratification design.

Additional applications include, but are not limited to, removal of hydrocarbons from monitor wells, petrochemical plants and pipelines, aviation fueling facilities and rail and trucking fueling terminals as well as use as a containment and clean-up product for municipal entities charged with eliminating petrochemical spills.

The description of the preferred embodiment has been for the purpose of explanation and illustration. It will be appreciated by those skilled in the art that many modifications and changes can be made in the structure without departing from the essence of the present invention. Therefore, it is contemplated that the appended claims will cover any modifications or embodiments which fall within the scope of the invention.

What is claimed is:

1. A hydrocarbon absorbent device comprising
   an outer envelope of polypropylene fabric;
   a plurality of stacked layers of polypropylene fabric disposed within the envelope and forming a plurality of chambers in stratification with each of said chambers containing polynorbornene therein, said plurality of stacked fabric layers dispersively conducting liquid hydrocarbons under capillary attraction throughout the interior of the envelope for absorption and solidification by the polynorbornene material;
   a seam joinder of the envelope and the stacked layers.

* * * * *